(12) United States Patent
Zhong

(10) Patent No.: US 12,340,234 B2
(45) Date of Patent: Jun. 24, 2025

(54) APPLICATION SHARING METHOD AND ELECTRONIC DEVICE

(71) Applicant: VIVO MOBILE COMMUNICATION CO., LTD., Dongguan (CN)

(72) Inventor: Renzhan Zhong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 321 days.

(21) Appl. No.: 17/832,527

(22) Filed: Jun. 3, 2022

(65) Prior Publication Data
US 2022/0300302 A1 Sep. 22, 2022

Related U.S. Application Data

(63) Continuation of application No. PCT/CN2020/132634, filed on Nov. 30, 2020.

(30) Foreign Application Priority Data

Dec. 5, 2019 (CN) .......................... 201911235691.2

(51) Int. Cl.
*G06F 3/0481* (2022.01)
*G06F 3/04847* (2022.01)
(Continued)

(52) U.S. Cl.
CPC ............ *G06F 9/451* (2018.02); *G06F 3/0481* (2013.01); *G06F 3/04847* (2013.01); *G06F 3/0486* (2013.01)

(58) Field of Classification Search
CPC .. G06F 3/0481; G06F 3/04847; G06F 3/0486; G06F 2203/04803
See application file for complete search history.

(56) References Cited

U.S. PATENT DOCUMENTS 10,051,103 B1  8/2018 Gordon et al.
10,324,586 B1  6/2019 Parmar et al.
(Continued)

FOREIGN PATENT DOCUMENTS

CN  104967637 A  10/2015
CN  105308634 A  2/2016
(Continued)

OTHER PUBLICATIONS

International Search Report issued in corresponding International Application No. PCT/CN2020/132634, mailed Feb. 7, 2021, 5 pages.
(Continued)

*Primary Examiner* — Jeanette J Parker
(74) *Attorney, Agent, or Firm* — IPX PLLC

(57) ABSTRACT

An application sharing method and an electronic device are provided. An exemplary method includes: receiving a first input; displaying N second electronic device identifiers in a first display region in response to the first input, where N is a positive integer; receiving a second input; displaying a running interface of a target application in a virtual screen in response to the second input; and sharing the running interface of the target application with L first target electronic devices. Electronic device identifiers corresponding to the L first target electronic devices are contained in the N second electronic device identifiers.

19 Claims, 16 Drawing Sheets

(51) Int. Cl.
    *G06F 3/0486*    (2013.01)
    *G06F 9/451*     (2018.01)

(56) References Cited

U.S. PATENT DOCUMENTS

| | | | | |
|---|---|---|---|---|
| 2016/0065648 A1* | 3/2016 | Kim | ...................... | H04L 51/043 |
| | | | | 715/748 |
| 2016/0110152 A1* | 4/2016 | Choi | .................. | G06F 3/04817 |
| | | | | 345/2.3 |
| 2017/0060408 A1* | 3/2017 | Wang | .................. | G06F 3/04817 |
| 2020/0257425 A1* | 8/2020 | Ye | .......................... | H04L 65/40 |

FOREIGN PATENT DOCUMENTS

| | | | |
|---|---|---|---|
| CN | 106331758 A | 1/2017 | |
| CN | 106453538 A | 2/2017 | |
| CN | 106528021 A | 3/2017 | |
| CN | 107943489 A | 4/2018 | |
| CN | 108920119 A | 11/2018 | |
| CN | 109976821 A | 7/2019 | |
| CN | 111092990 A | 5/2020 | |
| WO | 2014200730 A1 | 12/2014 | |
| WO | 2019071872 A1 | 4/2019 | |

OTHER PUBLICATIONS

First Office Action issued in related Chinese Application No. 201911235691.2, mailed Oct. 26, 2020, 8 pages.
Second Office Action issued in related Chinese Application No. 201911235691.2, mailed Apr. 1, 2021, 5 pages.
Extended European Search Report issued in related European Application No. 20895115.2, mailed Dec. 12, 2022, 13 pages.

* cited by examiner

APPLICATION SHARING METHOD AND ELECTRONIC DEVICE

CROSS-REFERENCE TO RELATED APPLICATIONS

This application is a continuation of International Application No. PCT/CN2020/132634, filed on Nov. 30, 2020, which claims priority to Chinese Patent Application No. 201911235691.2, filed on Dec. 5, 2019. The entire contents of each of the above-identified applications are expressly incorporated herein by reference.

TECHNICAL FIELD

The present disclosure relates to the field of communications technologies, and in particular, to an application sharing method and an electronic device.

BACKGROUND

With the rapid development of computer technologies, functions of electronic devices are becoming richer, and a demand for function sharing between different electronic devices is increasing. For example, application sharing is a common sharing demand.

Currently, the most common way of sharing an application between electronic devices is remote control via remote control software, that is, two electronic devices can be connected via a remote control application. One electronic device controls a desktop of the other electronic device. In this case, an application on the desktop can be viewed and used, thereby sharing the application on the other device with the one device. However, in the sharing process, the device that shares the application is controlled by the other device and is not allowed to be operated, resulting in poor device utilization.

SUMMARY

The present disclosure is implemented as follows:

According to a first aspect, an embodiment of the present disclosure provides an application sharing method, applied to a first electronic device and including:

receiving a first input;

displaying N second electronic device identifiers in a first display region in response to the first input, where N is a positive integer;

receiving a second input;

displaying a running interface of a target application in a virtual screen in response to the second input; and sharing the running interface of the target application with L first target electronic devices, where electronic device identifiers corresponding to the L first target electronic devices are contained in the N second electronic device identifiers.

According to a second aspect, an embodiment of the present disclosure provides a first electronic device, including:

a first receiving module, configured to receive a first input;

a first displaying module, configured to display N second electronic device identifiers in a first display region in response to the first input, where N is a positive integer;

a second receiving module, configured to receive a second input;

a second displaying module, configured to display a running interface of a target application in a virtual screen in response to the second input; and a sharing processing module, configured to share the running interface of the target application with L first target electronic devices, where electronic device identifiers corresponding to the L first target electronic devices are contained in the N second electronic device identifiers.

According to a third aspect, an embodiment of the present disclosure provides an electronic device, including a processor, a memory, and a computer program stored in the memory and capable of running on the processor, and when executed by the processor, the computer program implements the steps of the foregoing application sharing method.

According to a fourth aspect, an embodiment of the present disclosure provides a computer-readable storage medium. The computer-readable storage medium stores a computer program, and when executed by a processor, the computer program implements the steps of the foregoing application sharing method.

According to a fifth aspect, an embodiment of the present disclosure provides a computer program product. The program product is stored in a non-volatile storage medium, and when executed by at least one processor, the program product implements the steps of the foregoing application sharing method.

According to a sixth aspect, an embodiment of the present disclosure provides an electronic device. The electronic device is configured to perform the steps of the foregoing application sharing method.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
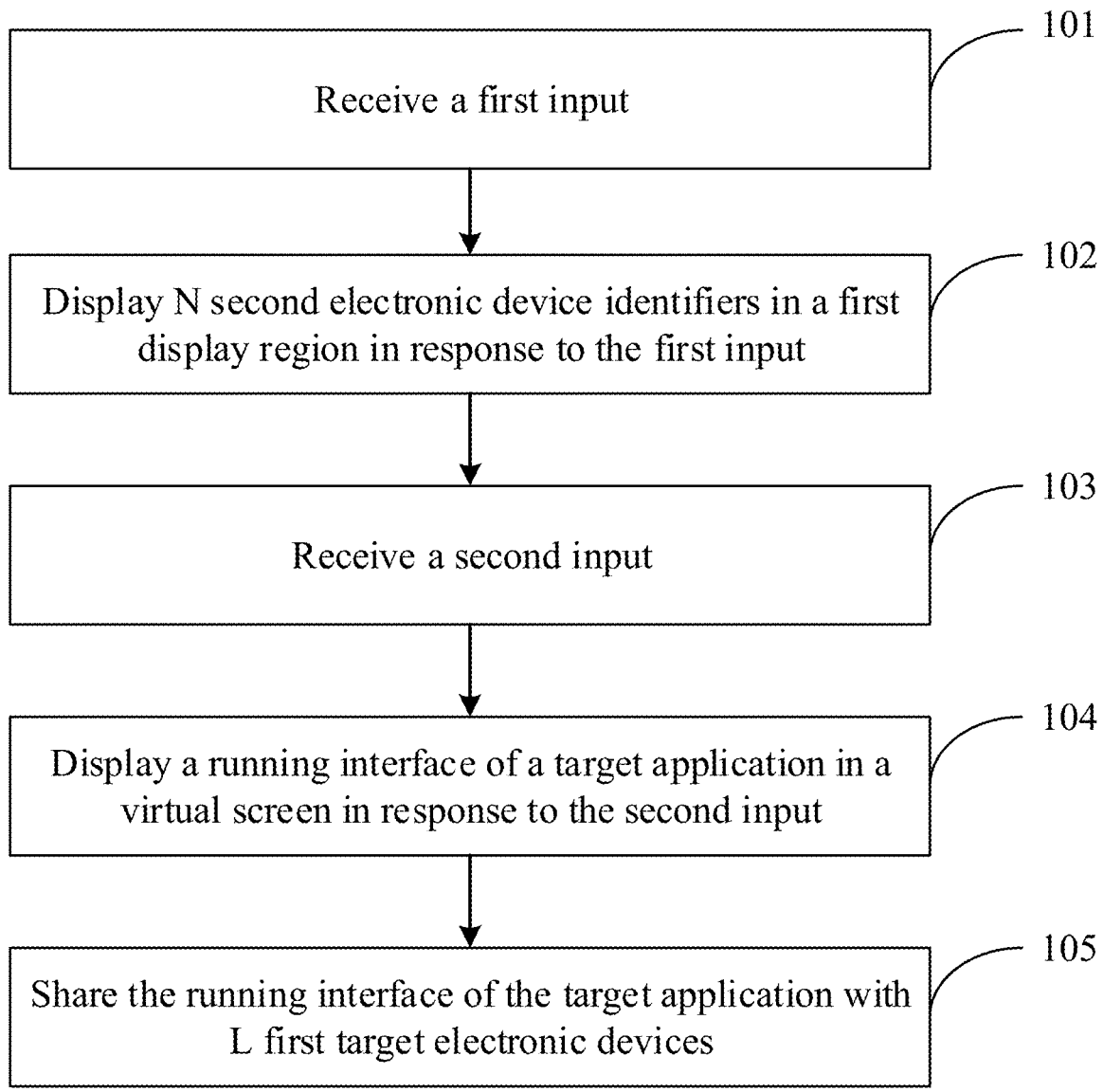
FIG. 1 is a first flowchart of an application sharing method according to an embodiment of the present disclosure.

Referring to FIG. 1, FIG. 1 is a flowchart of an application sharing method according to an embodiment of the present disclosure. As shown in FIG. 1, the method includes the following steps:

Step 101: Receive a first input.

Step 102: Display N second electronic device identifiers in a first display region in response to the first input, where N is a positive integer.

In some embodiments, the second electronic device identifiers may include device names, and may further include device icons.

It should be understood that, in an embodiment, the first input may be a sliding gesture, for example, a sliding operation of sliding upwards from a bottom end of a screen or a sliding operation of sliding downwards from a top end of the screen. In another embodiment, the first input may, for example, be a voice input, or an operation instruction input in another form. The first input is used to trigger displaying of the first display region in which one or more second electronic device identifiers are displayed. In this embodiment, the N second electronic device identifiers may be understood as electronic device identifiers corresponding to receiving devices of application sharing. The user can share the target application with some or all of second electronic devices corresponding to the N second electronic device identifiers.

Figure 2:
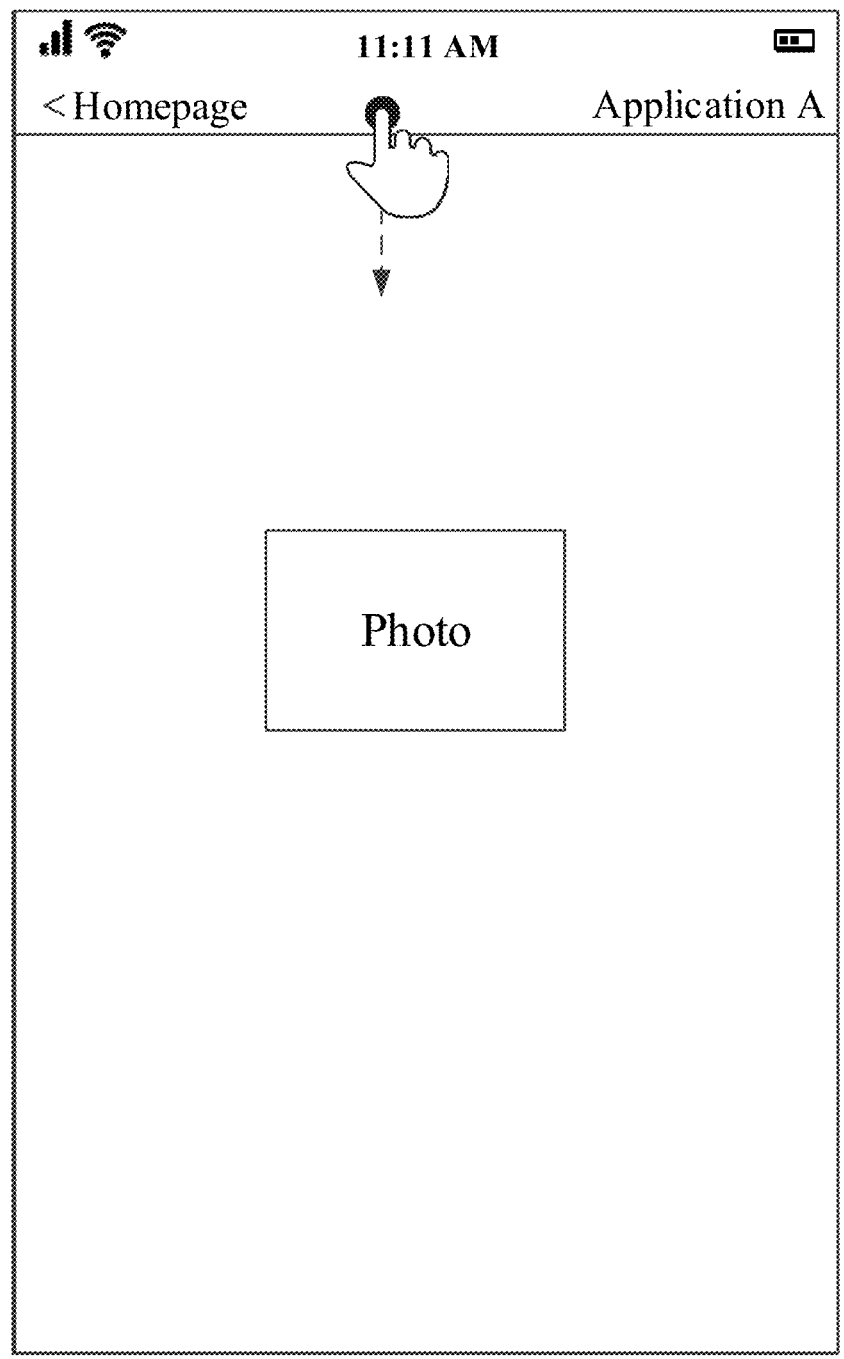
FIG. 2 is a first schematic diagram of an interface of a first electronic device in an application sharing method according to an embodiment of the present disclosure.
Figure 3:
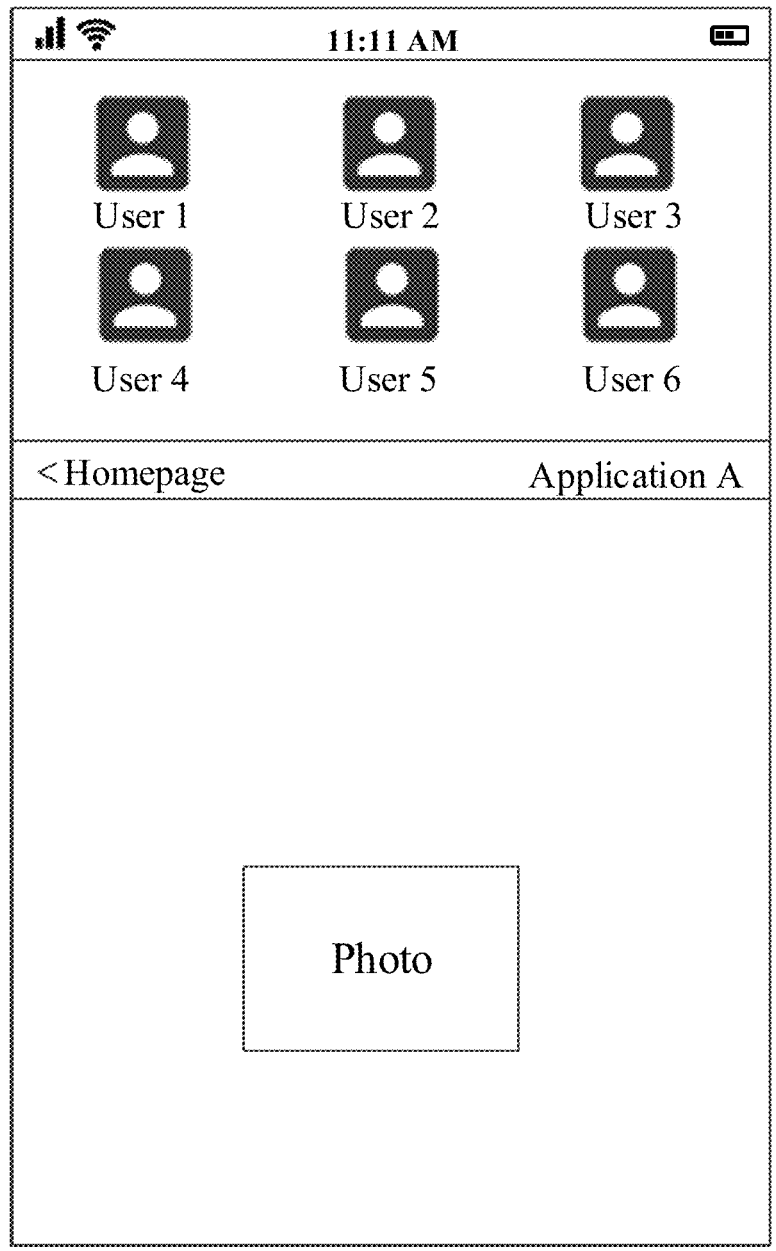
FIG. 3 is a second schematic diagram of an interface of a first electronic device in an application sharing method according to an embodiment of the present disclosure.

It should be noted that, an application sharing manner may be set according to actual needs. For example, in an embodiment, the user can share only an application running in a foreground. In this case, the N second electronic device identifiers are displayed in only the first display region. Specifically, as shown in FIG. 2, in a case that an application is running in the foreground of the first electronic device (namely, a case that the first electronic device currently displays an operation interface of the application), when user's operations of clicking a frame region at a top of a display interface of the application and sliding downwards are received, the display interface is jumped to an interface shown in FIG. 3. Because the N second electronic device identifiers are displayed in only the first display region during foreground application sharing, the user can share a currently running application only by performing an operation on the second electronic device identifier. This can simplify a sharing operation of the user.

In another embodiment, the user can share a preset application installed in the first electronic device. The preset application may be all applications, or one or more applications that are preconfigured to allow application sharing. In this case, in addition to the first display region displaying the N second electronic device identifiers, the second display region displays one or more application identifiers. In other words, in this embodiment, after the receiving a first input, the method further includes:

displaying M application identifiers in a second display region in response to the first input, where M is a positive integer, and an application identifier of the target application is contained in the M application identifiers.

Figure 4:
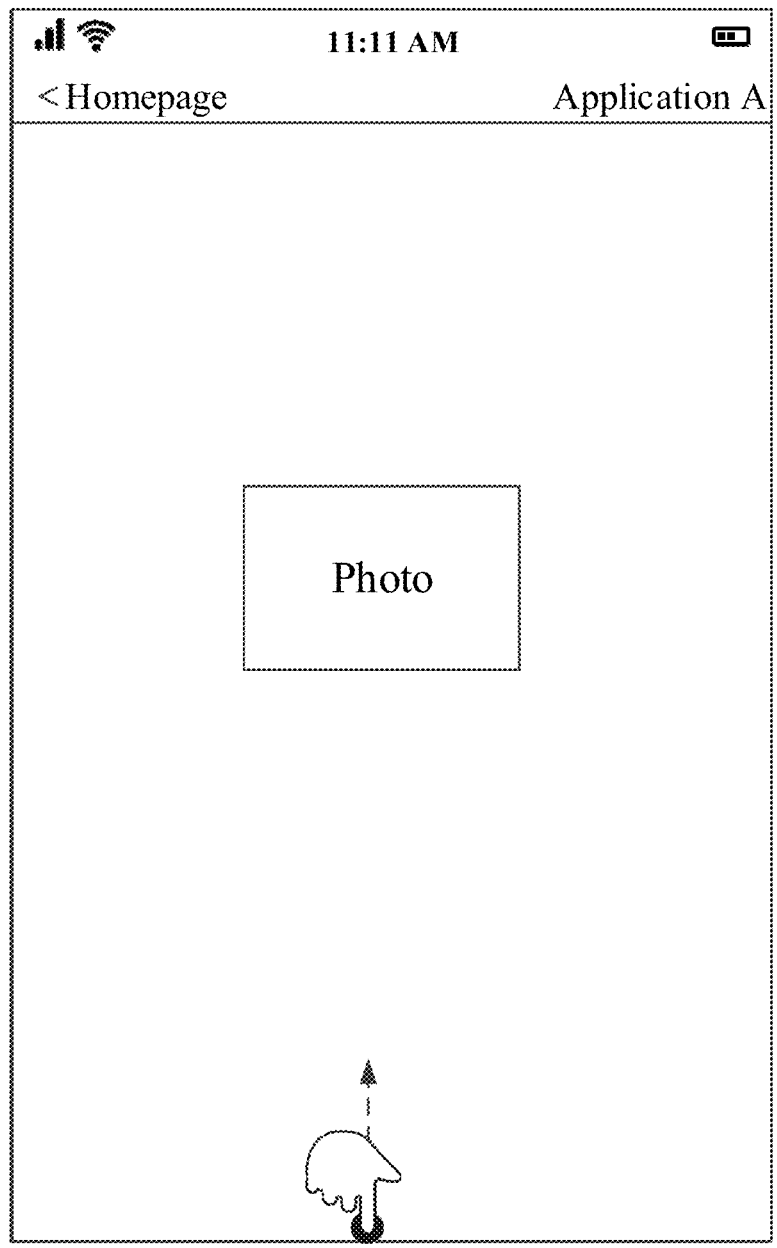
FIG. 4 is a third schematic diagram of an interface of a first electronic device in an application sharing method according to an embodiment of the present disclosure.
Figure 5:
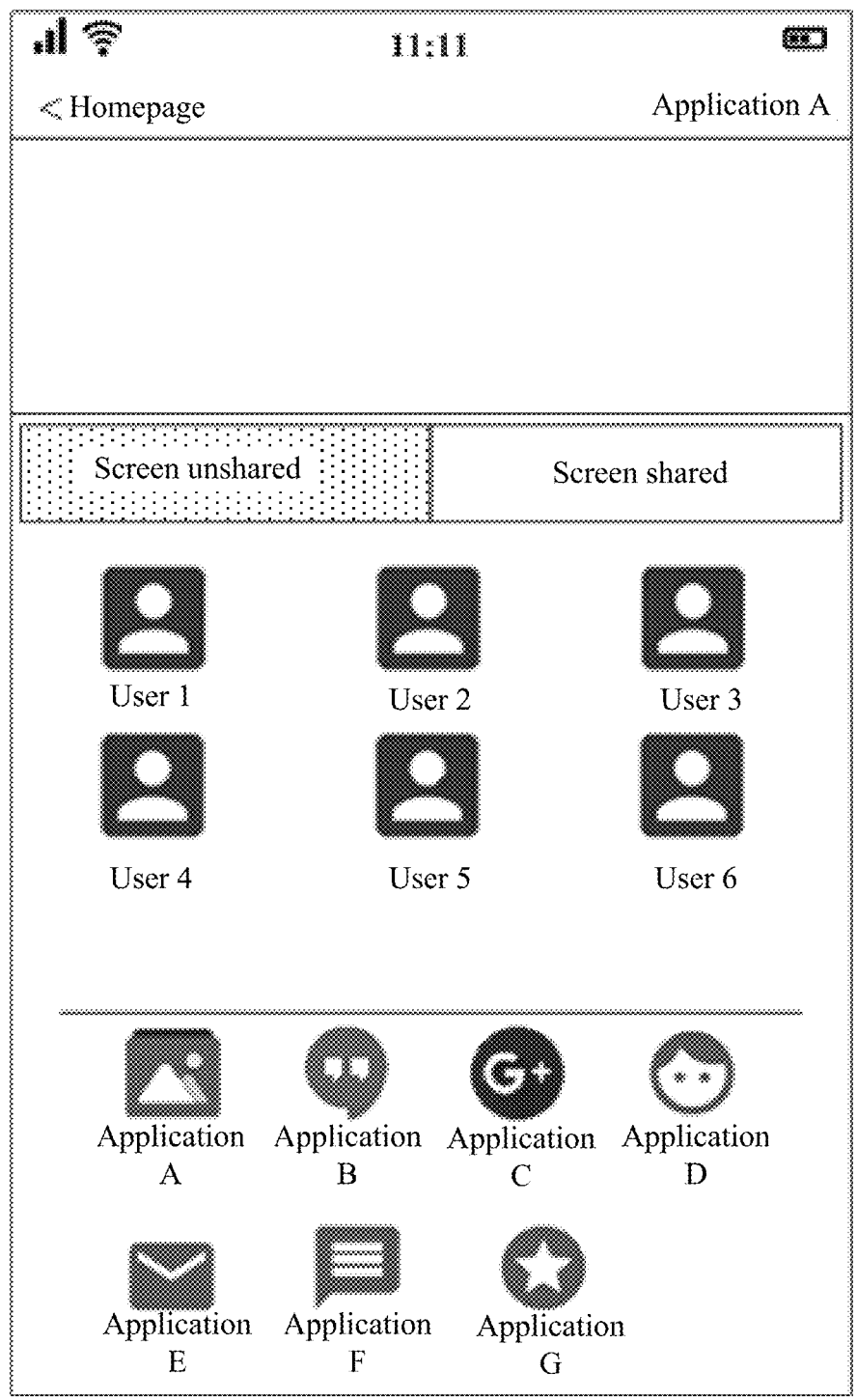
FIG. 5 is a fourth schematic diagram of an interface of a first electronic device in an application sharing method according to an embodiment of the present disclosure.

The application identifier may include at least one of an application name and an application icon. Specifically, as shown in FIG. 4, in a case that an application is running in the foreground of the first electronic device, when user's operation of sliding upwards from a bottom end of a screen is received, the screen is jumped to an interface shown in FIG. 5. In FIG. 5, the second electronic device identifier and the application identifier are displayed by using a pop-up window. The first display region and the second display region are two different display regions of the pop-up window. In this embodiment, because both the application identifier and the second electronic device identifier are displayed, the user does not need to exit a current application, thereby improving flexibility of application sharing.

Step 103: Receive a second input.

Step 104: Display a running interface of a target application in a virtual screen in response to the second input.

Step 105: Share the running interface of the target application with L first target electronic devices.

Electronic device identifiers corresponding to the L first target electronic devices are contained in the N second electronic device identifiers.

In this embodiment, the second input may be understood as an input including a selection operation of selecting the L first target electronic devices and a triggering operation of triggering sharing of the target application with the first target electronic device. It should be noted that, the triggering operation and the selection operation may be a same operation (that is, when the selection operation of selecting the L first target electronic devices is completed, the first electronic device can be triggered to share the target application with the first target electronic device without performing another operation), or may be different operations (that is, after the selection operation of selecting the L first target electronic devices is completed, the first electronic device can be triggered to share the target application with the first target electronic device provided that the triggering operation is further performed). Specifically, the second input may be a slide input, a tap input, a voice input, or the like. Different application scenarios may correspond to different input manners.

The following describes, in detail by using an example in which an electronic device 1 shares an application with an electronic device 2, a specific implementation in which the first electronic device shares the target application with the L first target electronic devices.

When the electronic device 1 shares the application with the electronic device 2, the electronic device 1 may be understood as a sending end of application sharing, and the electronic device 2 may be understood as a receiving end of application sharing. The electronic device 1 may run the target application, and display the running interface of the target application in a virtual screen; and in a case that a connection is established between the electronic device 1 and the electronic device 2, the electronic device 1 may share, with the electronic device 2, the running interface that is of the target application and that is displayed in the virtual screen.

That the electronic device 1 shares, with the electronic device 2, the running interface that is of the target application and that is displayed in the virtual screen may be understood as follows: The electronic device 1 performs screen recording on the virtual screen and records audio in the virtual screen, thereby obtaining target data, and sharing the target data with the electronic device 2, where the target data includes a sequence of displayed pictures and an audio sequence of the virtual screen.

Further, the electronic device 2 may display a received running interface, and send a corresponding operation instruction to the electronic device 1 when receiving user's operation based on the displayed running interface, thereby controlling the target application to perform an operation corresponding to the operation instruction. Therefore, application sharing between the electronic device 1 and the electronic device 2 is implemented.

According to the embodiments of the present disclosure, the method includes: receiving a first input; displaying N second electronic device identifiers in a first display region in response to the first input, where N is a positive integer; receiving a second input; displaying a running interface of a target application in a virtual screen in response to the second input; and sharing the running interface of the target application with L first target electronic devices, where electronic device identifiers corresponding to the L first target electronic devices are contained in the N second electronic device identifiers. In this way, because the running interface of the target application is displayed in the virtual screen to share the application, in a process of sharing the application by the first electronic device, other functions of the first electronic device are not affected, and a user can also perform an operation for another application on the first electronic device. This improves utilization of the first electronic device. In addition, because the N second electronic device identifiers are displayed in the first display region, the user can quickly select one or more of the second electronic device identifiers for application sharing. This improves convenience for application sharing.

In an embodiment, in a case that both the first display region and the second display region are displayed, the receiving a second input includes:

receiving a dragging operation for the application identifier corresponding to the target application, where an end position of the dragging operation corresponds to a display position of an electronic device identifier of the first target electronic device.

Figure 6:
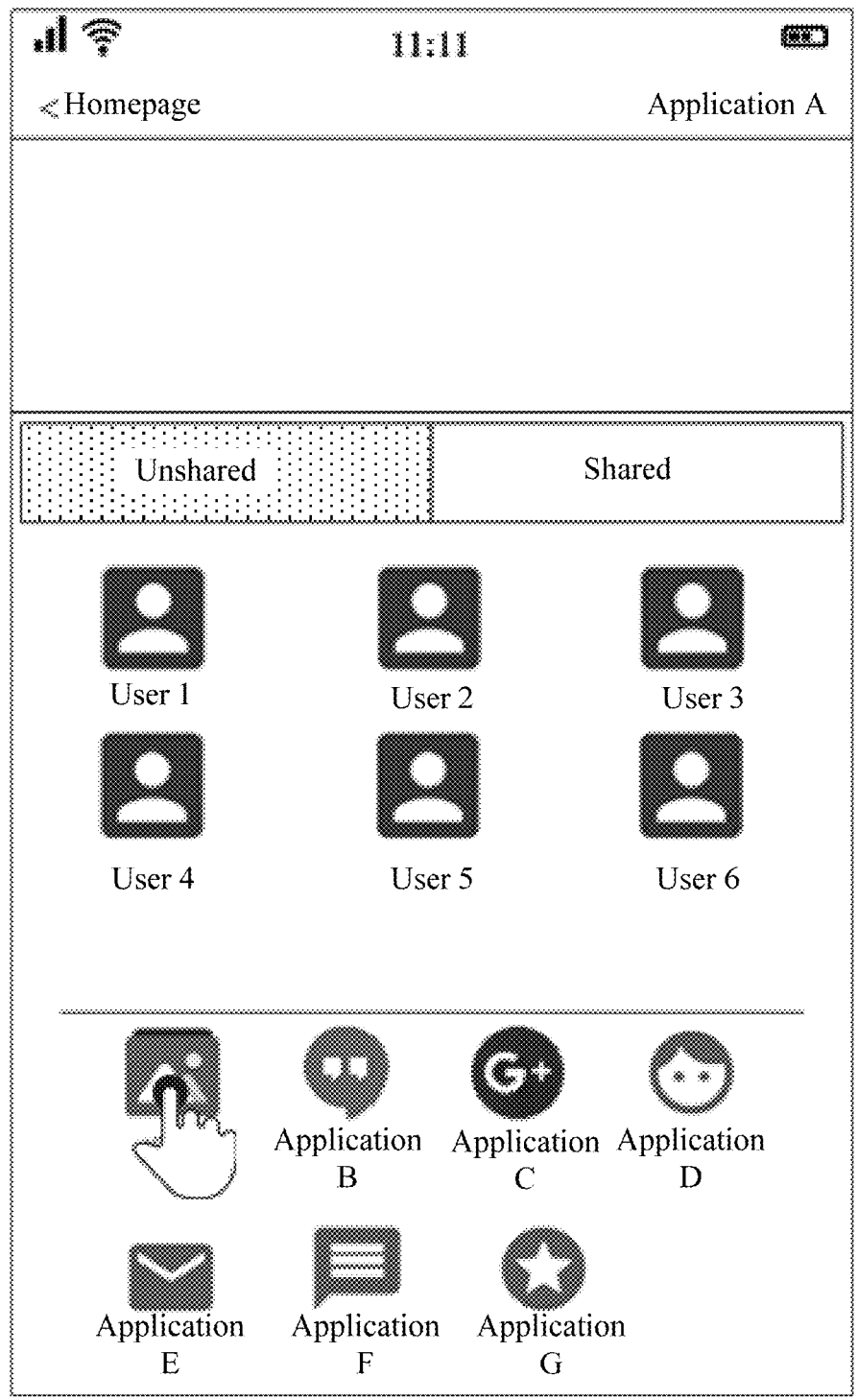
FIG. 6 is a fifth schematic diagram of an interface of a first electronic device in an application sharing method according to an embodiment of the present disclosure.
Figure 7:
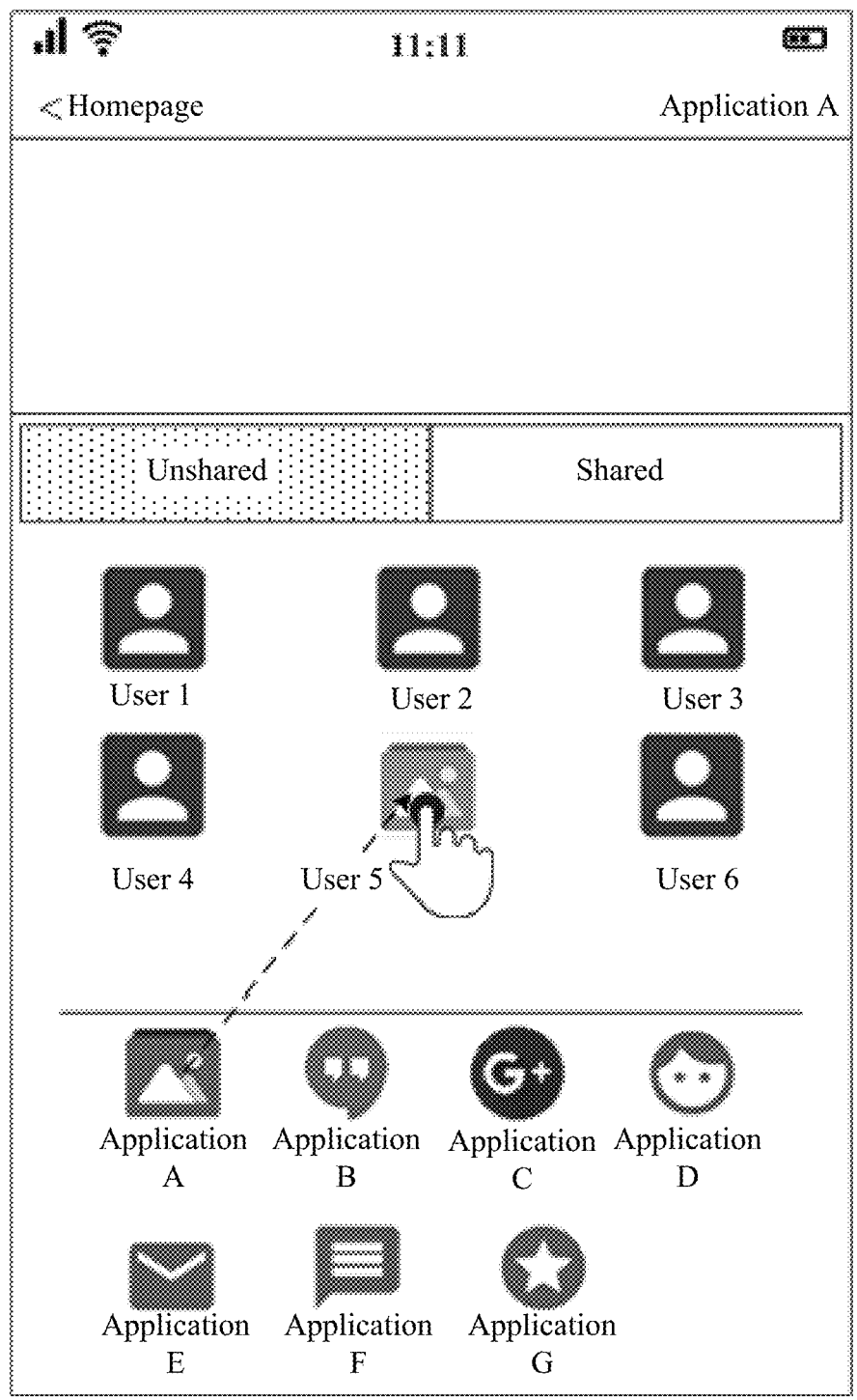
FIG. 7 is a sixth schematic diagram of an interface of a first electronic device in an application sharing method according to an embodiment of the present disclosure.

The dragging operation may be understood as a triggering operation of triggering the first electronic device to share the target application with the first target electronic device. Specifically, the dragging operation may be understood as a sliding operation. Specifically, as shown in FIG. 6 and FIG. 7, the user may first touch the identifier of the target application, and then slide to a second electronic device identifier corresponding to the first target electronic device to which the target application needs to be shared, where an end point of the sliding only needs to be associated with a display position corresponding to the second electronic device identifier.

It should be understood that in a sliding or dragging process, the application identifier of the target application may move with a position currently touched in the sliding operation. When the application identifier moves to a display position corresponding to the second electronic device identifier 1 (for example, an overlapped area between the application identifier of the target application moved with the position currently touched and the second electronic device identifier 1 is greater than a preset value), and the sliding operation ends (for example, the touching ends or the touching lasts for time greater than a preset value), the first electronic device may be triggered to share the target application with the first target electronic device.

In some embodiments, that the application identifier of the target application moves with the position currently touched in the sliding operation may be understood as follows: The application identifier that is of the target application and that is displayed in the second display region is controlled to move with the position touched. In some embodiments, the application identifier that is of the target application and that is displayed in the second display region is retained and copied, and the copy is moved with the position touched.

Further, to avoid a mis-operation, in this embodiment of the present disclosure, when the dragging operation ends, a prompt box may also be popped up for the user to select. Specifically, as shown in FIG. 6 and FIG. 7, in a case that an application A (namely, the target application) is shared with an electronic device corresponding to a user 5 (the electronic device identifier of the first target electronic device), an application sharing confirmation prompt box (namely, a sharing confirmation prompt box) is output for determining whether to share "Application A" (namely, screen sharing) with "User 5". Operation controls of "Confirm" and "Cancel" are provided in the application sharing confirmation prompt box. When the user clicks "Confirm", "Application A" is shared with "User 5". Then, the user may perform the second input again, or end the application sharing operation to return to an interface displayed before the first input is received. When clicking "Cancel", the user may perform the second input again, or end the application sharing operation to return to an interface displayed before the first input is received.

It should be noted that, one dragging operation may share the target application with one first target electronic device, as shown in FIG. 6 and FIG. 7. In this case, the selection operation and the triggering operation of the first target electronic device may be understood as a same operation. An electronic device corresponding to the second electronic device identifier 1 is the first target electronic device. When the target application needs to be shared with a plurality of first target electronic devices, the user may perform the dragging operation many times. Further, to improve operation convenience, as shown in FIG. 7, the L first target electronic devices may be first selected, and then the first electronic device may be triggered through the dragging operation, to share the target application with the L first target electronic devices. In this case, the selection operation and the triggering operation of the first target electronic device may be understood as different operations. The second electronic device identifier 1 is the L first target electronic devices that are selected. In other words, in this embodiment of the present disclosure, the receiving a second input includes:

receiving a first sliding operation in the first display region.

The L first target electronic devices are electronic devices corresponding to L second electronic device identifiers by which a sliding track corresponding to the first sliding operation passes.

Figure 8:
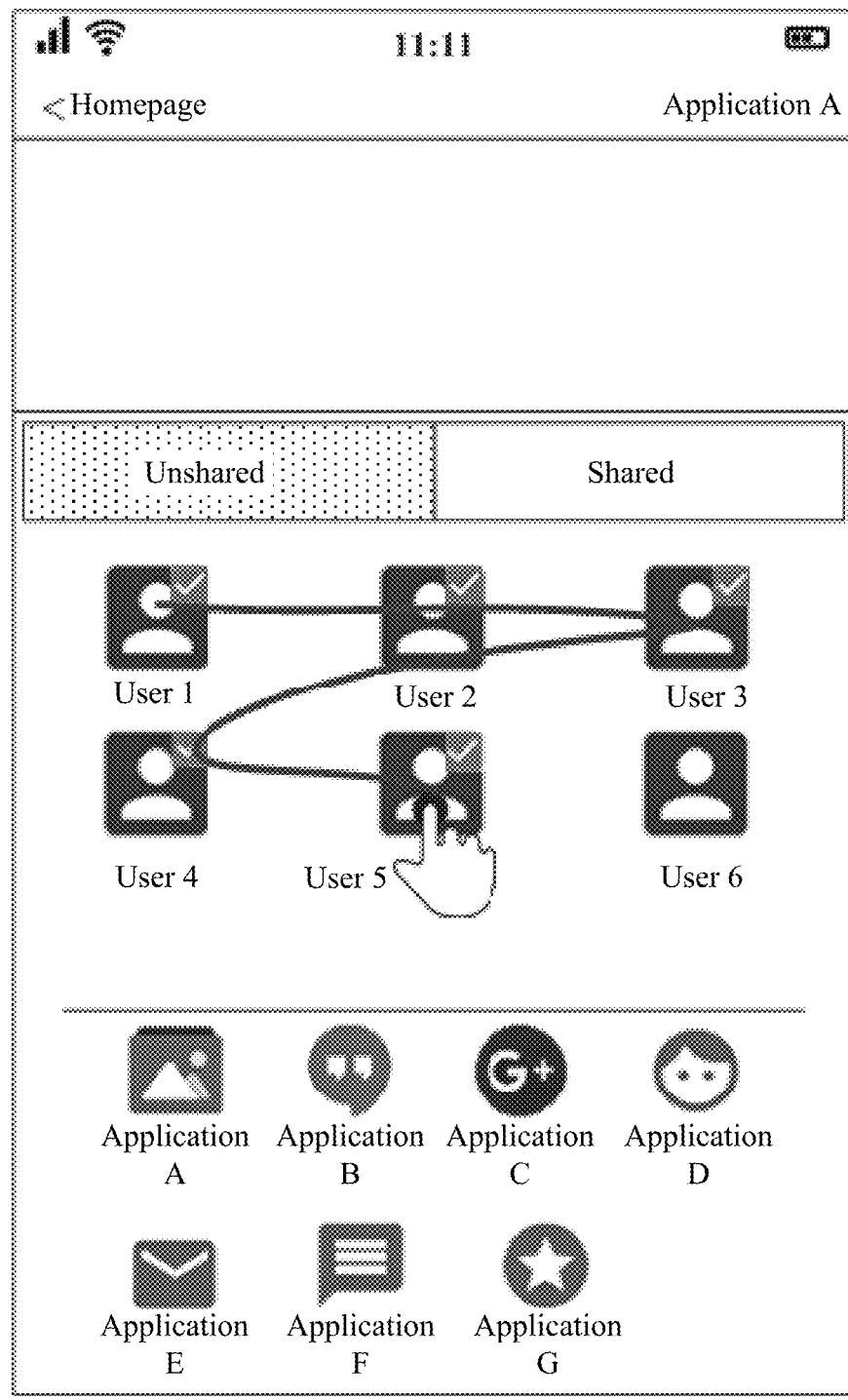
FIG. 8 is a seventh schematic diagram of an interface of a first electronic device in an application sharing method according to an embodiment of the present disclosure.

In this embodiment of the present disclosure, in an interface shown in FIG. 5, the user can perform the first sliding operation in the first display region. The sliding track corresponding to the first sliding operation is shown in FIG. 8. In this case, it can be determined that electronic devices corresponding to five second electronic device identifiers (a user 1, a user 2, a user 3, a user 4, and the user 5) by which the sliding track passes are determined as five first target electronic device identifiers. Then, in a case that an application identifier of a to-be-shared target application is dragged to a second device identifier (the user 1, the user 2, the user 3, the user 4, or the user 5), sharing the target application with an electronic device corresponding to the user 1, the user 2, the user 3, the user 4, or the user 5 may be triggered. Because in this embodiment of the present disclosure, one application can be shared with a plurality of electronic devices in one step, thereby improving convenience of an application sharing operation.

Figure 9:
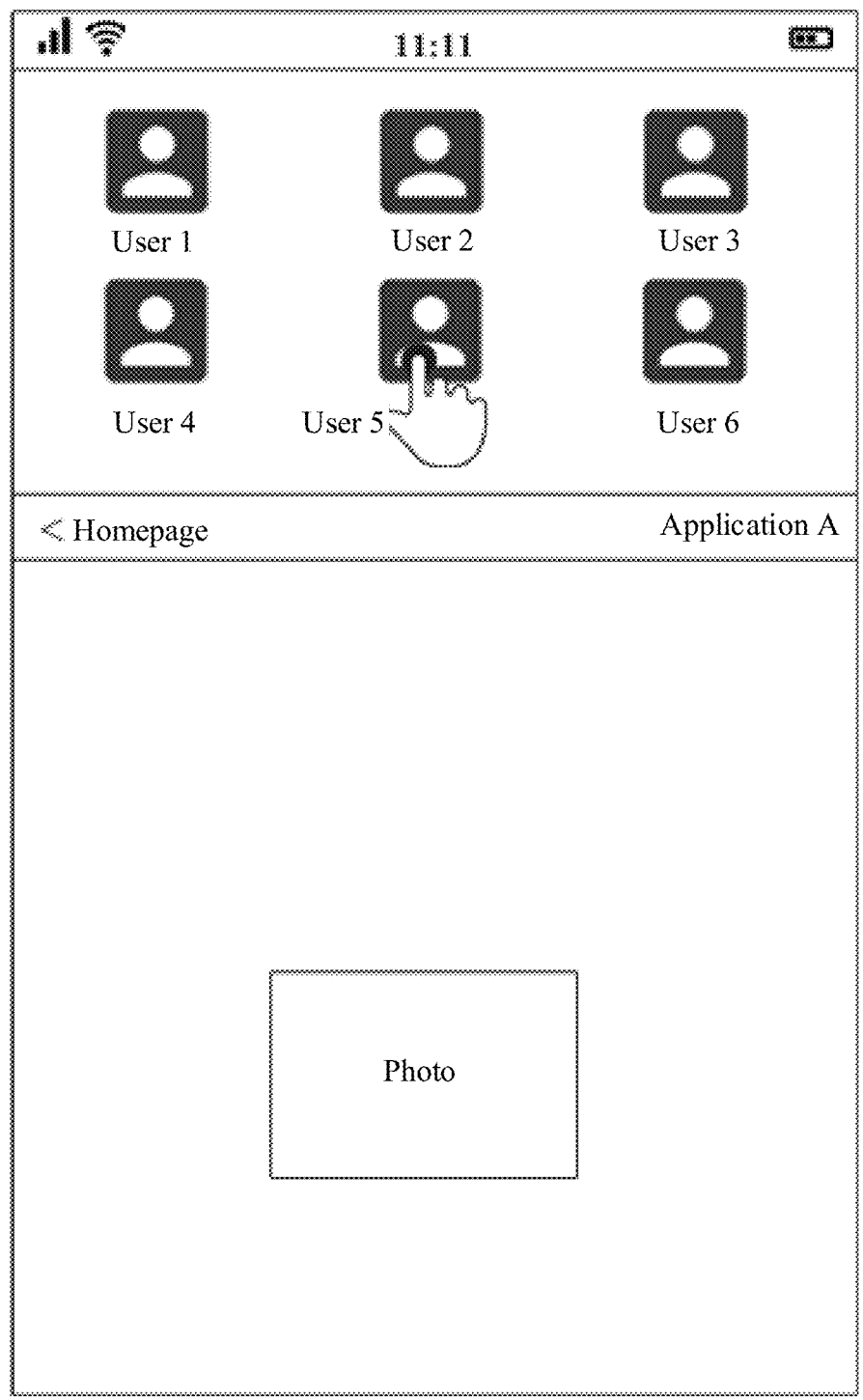
FIG. 9 is an eighth schematic diagram of an interface of a first electronic device in an application sharing method according to an embodiment of the present disclosure.

Further, in another embodiment, in a case that only the first display region is displayed based on the first input, the selection operation and the triggering operation of the first target electronic device are a same operation. As shown in FIG. 9, in an embodiment, the target application may be shared with one first target electronic device through a click operation.

Figure 10:
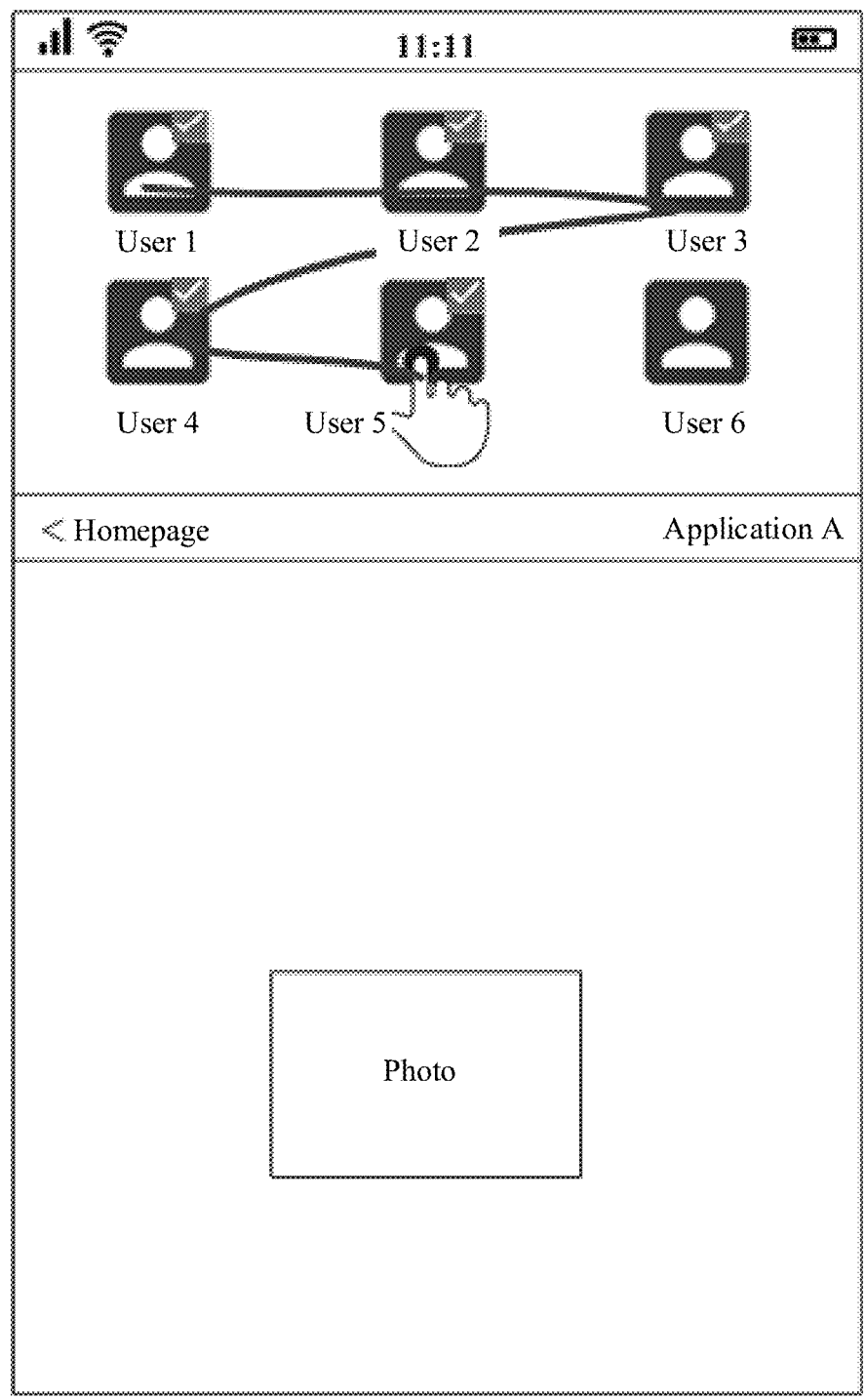
FIG. 10 is a ninth schematic diagram of an interface of a first electronic device in an application sharing method according to an embodiment of the present disclosure.

As shown in FIG. 10, in another embodiment, the target application may, for example, be shared with a plurality of first target electronic devices through a sliding operation in one step. In other words, in this embodiment of the present disclosure, the receiving a second input includes:

receiving a first sliding operation in the first display region.

The L first target electronic devices are electronic devices corresponding to L second electronic device identifiers by which a sliding track corresponding to the first sliding operation passes.

Further, to avoid a mis-operation, in this embodiment of the present disclosure, after the first target electronic device is selected, a corresponding application sharing confirmation prompt box may be output for the user to perform sharing confirmation. For a specific implementation process, refer to description of FIG. 6 and FIG. 7. Details are not described herein again.

Further, after application sharing is performed, application sharing for some or all electronic devices may also be ended. In this embodiment of the present disclosure, in step 105, the method further includes:

receiving a third input;

displaying K third electronic device identifiers in a third display region in response to the third input, where K is a positive integer, and the K third electronic device identifiers are contained in electronic device identifiers corresponding to the L first target electronic devices;

receiving a fourth input for the third display region; and canceling, in response to the fourth input, sharing of the running interface of the target application with M second target electronic devices, where electronic device identifiers corresponding to the M second target electronic devices are contained in the K third electronic device identifiers.

In an embodiment, the third input may be a preset sliding gesture, for example, a sliding operation of sliding upwards from a bottom end of a screen. Specifically, when both the first input and the third input are sliding operations of sliding upwards from the bottom end of the screen, the first input and the third input can be distinguished based on parameters such as different sliding speeds or different sliding distances. This is not further limited herein. In another embodiment, the first input and the third input may, for example, be a voice input, or an operation instruction input in another form. In this embodiment, the third input may be used to trigger displaying of the third display region and the second display region. For details, refer to FIG. 11.

In another embodiment, the third input may be one click operation. For example, the third input may be performed after the first input is received. Specifically, as shown in FIG. 4, operation options are set on the operation interface. The operation options include two options: "Unshared" and "Shared". The "Unshared" option is used to control an unshared second electronic device identifier (that may be understood as an electronic device identifier corresponding to an electronic device to which an application of the first electronic device is not shared) to be displayed in the first display region. The "Shared" option is used to control a shared third electronic device identifier (that may be understood as the electronic device identifier corresponding to the first target electronic device to which an application of the first electronic device is being shared) to be displayed in the third display region. Based on the interface shown in FIG. 4, the third input may be an input operation of clicking a shared operation option. After the third input is performed, an interface shown in FIG. 11 may be displayed.

In some embodiments, the first display region and the third display region may be understood as a same display region, or as different display regions having different display positions.

Figure 11:
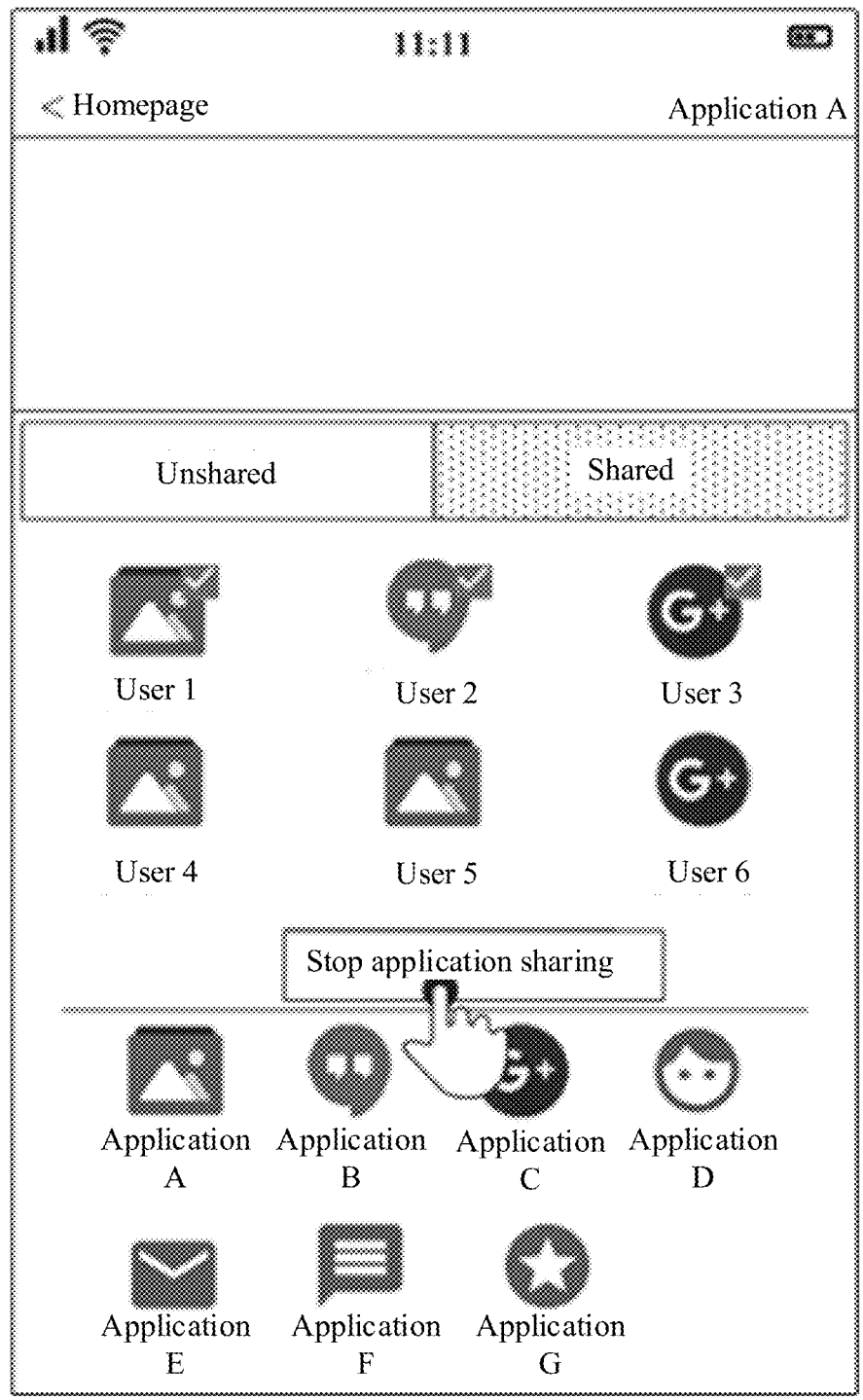
FIG. 11 is a tenth schematic diagram of an interface of a first electronic device in an application sharing method according to an embodiment of the present disclosure.

It should be noted that, in an embodiment, the fourth input may be understood as an input including a first operation of selecting the electronic device identifiers of the M second target electronic devices and a second operation of triggering canceling of application sharing. For example, as shown in FIG. 11, an operation control for stopping application sharing may be set in the third display region. The second operation may be an operation of clicking the operation control. In another embodiment, it may be, for example, understood as that only the first operation is included. In other words, after the third electronic device identifier is selected, an operation of stopping application sharing is triggered directly.

In some embodiments, a manner of inputting the first operation of selecting the third electronic device identifier may be set according to actual needs. For example, the third electronic device identifier may be selected through clicking or sliding. In other words, the receiving a fourth input for the third display region may include any one of the following:

receiving the click operation for the K third electronic device identifiers, where the electronic devices corresponding to the third electronic device identifiers corresponding to the click operation are the second target electronic devices; and receiving a second sliding operation for the first display region, where an electronic device corresponding to a third electronic device identifier by which a sliding track corresponding to the second sliding operation passes is the second target electronic device.

The receiving the click operation for the K third electronic device identifiers may be understood as one operation of canceling application sharing for one electronic device. In a case that an operation of canceling application sharing for a plurality of electronic devices needs to be performed, the fourth input may be performed many times. The receiving a second sliding operation for the first display region may be understood as one operation of canceling, in on step, application sharing for at least two electronic devices.

It should be noted that, to avoid a mis-operation, a corresponding prompt box may also be output when canceling of application sharing is triggered. The prompt box presents the third electronic device identifier for which application sharing needs to be stopped, and provides operation options of "Confirm" and "Cancel". When the user selects "Confirm", the operation of stopping application sharing is performed. When the user selects "Cancel", a third electronic device identifier that requires an application wind direction needs to be reselected.

Figure 12:
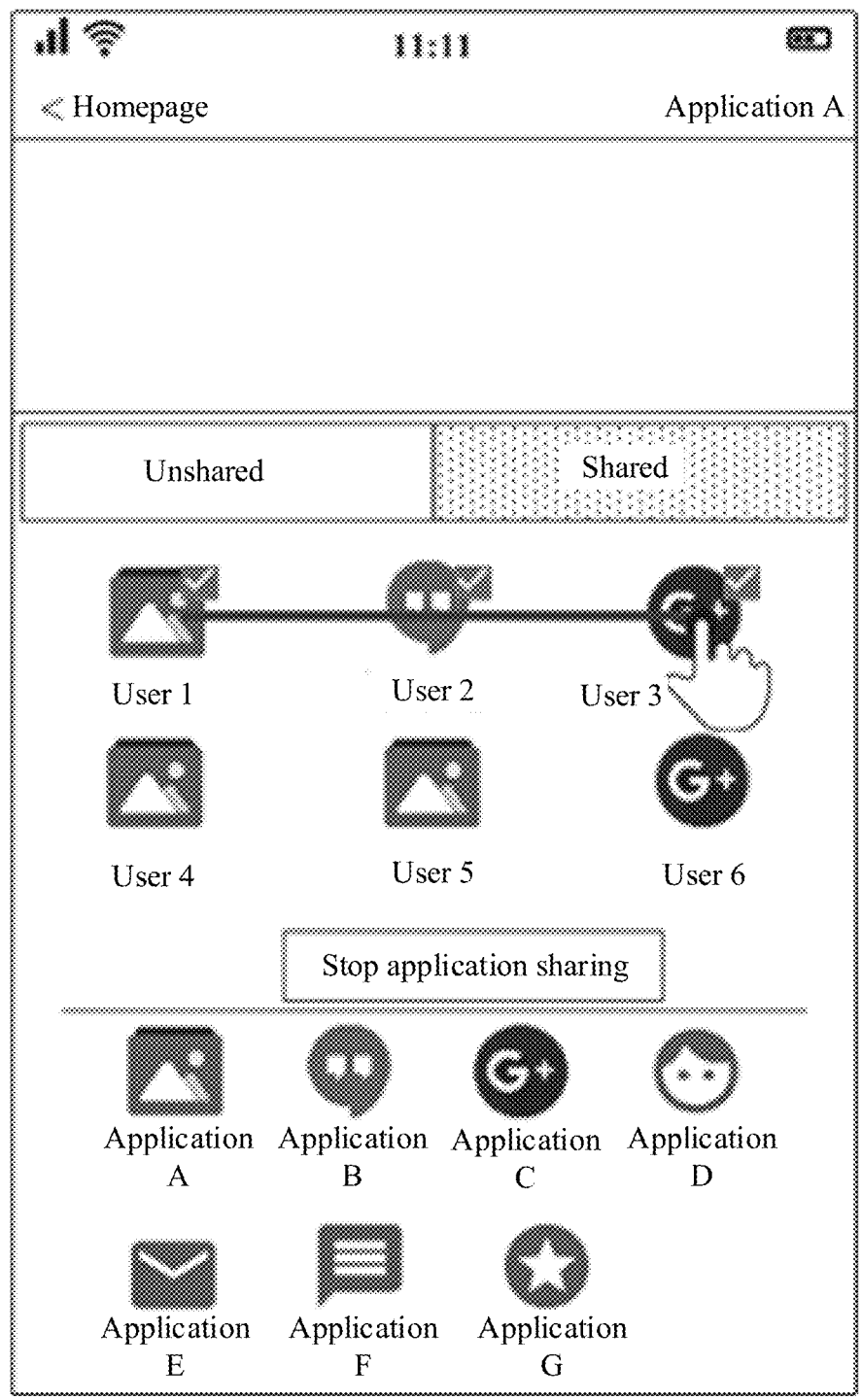
FIG. 12 is an eleventh schematic diagram of an interface of a first electronic device in an application sharing method according to an embodiment of the present disclosure.
Figure 13:
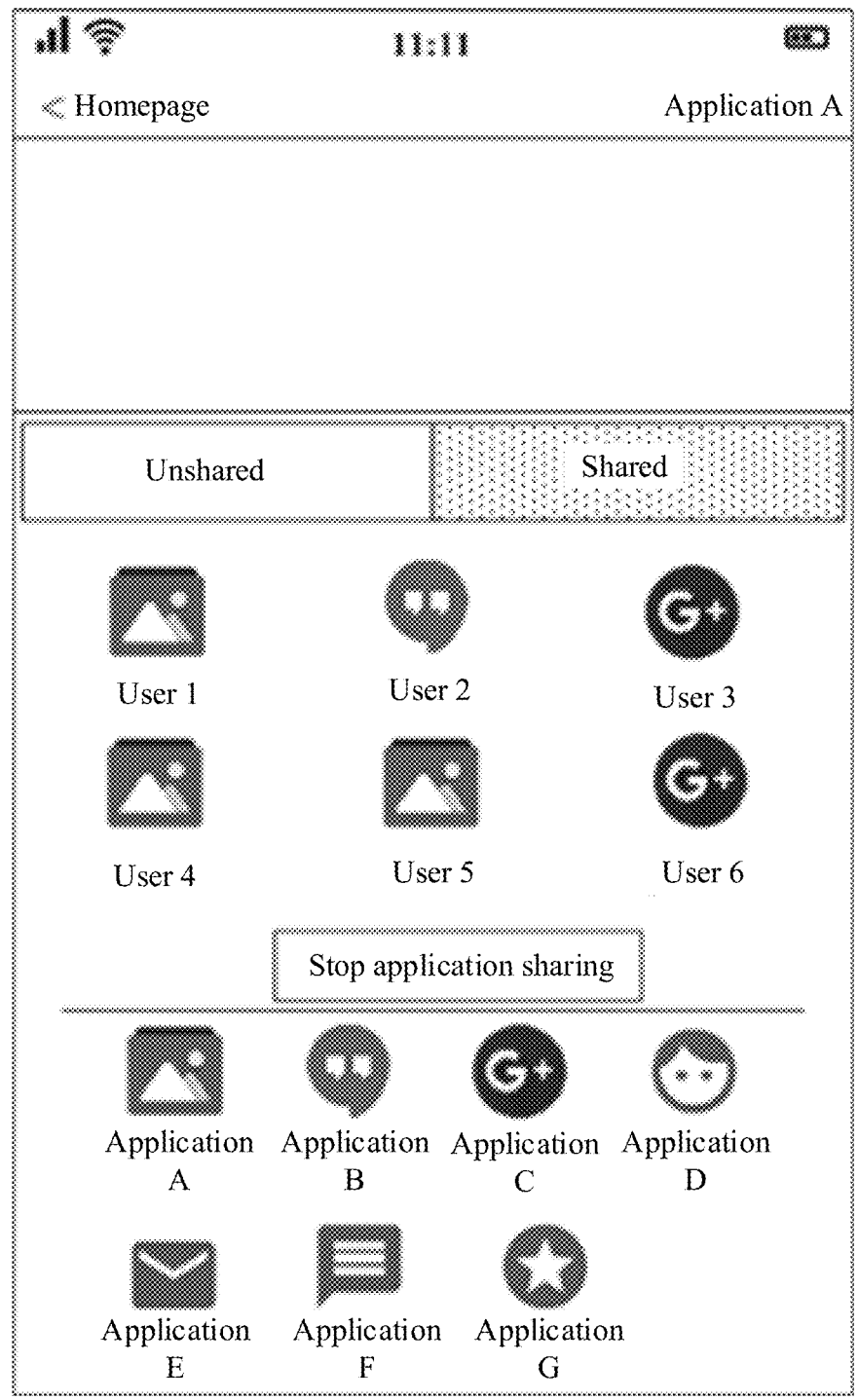
FIG. 13 is a twelfth schematic diagram of an interface of a first electronic device in an application sharing method according to an embodiment of the present disclosure.
Figure 14:
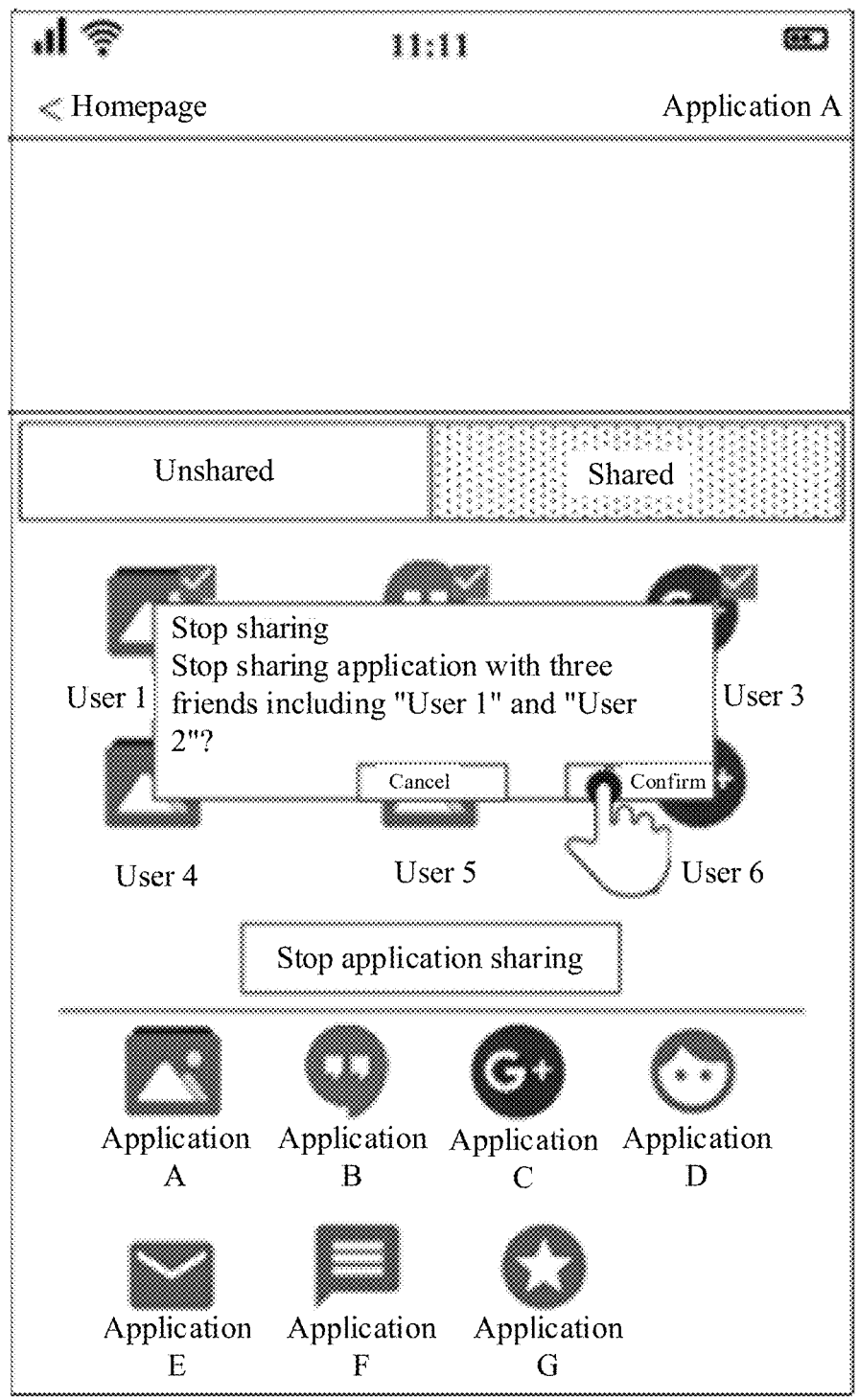
FIG. 14 is a thirteenth schematic diagram of an interface of a first electronic device in an application sharing method according to an embodiment of the present disclosure.

Further, after selection of the M third electronic device identifiers, marked displaying may also be performed on the selected third electronic device identifiers, to prompt the user to currently select a second target electronic device for which application sharing needs to be canceled. For example, the user may select three third electronic device identifiers (the user 1, the user 2, and the user 3) through the second sliding operation (a sliding track shown in FIG. 12), and tick the selected three third electronic device identifiers (in another embodiment, the selected three third electronic device identifiers may be, for example, marked in manners such as zooming in, zooming out, or coloring). For details, refer to FIG. 13. When the user clicks the operation control for stopping application sharing, a corresponding prompt box is popped up. For details, refer to FIG. 14. When the user selects the option of "Confirm", a function of sharing an application with the user 1, the user 2, and the user 3 is stopped.

It should be noted that, the second electronic device identifier may specifically include at least one of an electronic device identifier corresponding to an application sharing request list, an electronic device identifier corresponding to an electronic device list found in a near field, and an electronic device identifier corresponding to an application sharing friend list.

Figure 15:
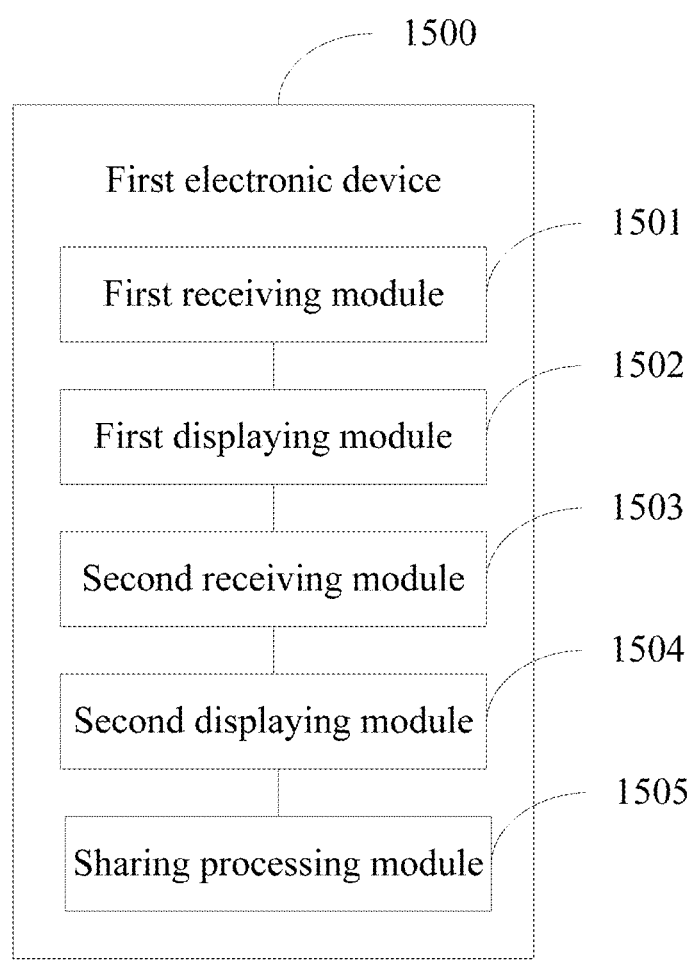
FIG. 15 is a structural diagram of a first electronic device according to an embodiment of the present disclosure.

Referring to FIG. 15, FIG. 15 is a structural diagram of a first electronic device according to an embodiment of the present disclosure. As shown in FIG. 15, the first electronic device 1500 includes:

a first receiving module 1501, configured to receive a first input;

a first displaying module 1502, configured to display N second electronic device identifiers in a first display region in response to the first input, where N is a positive integer;

a second receiving module 1503, configured to receive a second input;

a second displaying module 1504, configured to display a running interface of a target application in a virtual screen in response to the second input; and a sharing processing module 1505, configured to share the running interface of the target application with L first target electronic devices.

Electronic device identifiers corresponding to the L first target electronic devices are contained in the N second electronic device identifiers.

In some embodiments, the target application is an application running in a foreground.

In some embodiments, the first displaying module 1502 is further configured to display M application identifiers in a second display region in response to the first input, where M is a positive integer, and an application identifier of the target application is contained in the M application identifiers.

In some embodiments, the second receiving module 1503 includes:

a first receiving unit, configured to receive a dragging operation for the application identifier corresponding to the target application, where an end position of the dragging operation corresponds to a display position of an electronic device identifier of the first target electronic device.

In some embodiments, the second receiving module 1503 includes:

a second receiving unit, configured to receive a first sliding operation in the first display region, where the L first target electronic devices are electronic devices corresponding to L second electronic device identifiers by which a sliding track corresponding to the first sliding operation passes.

In some embodiments, the first receiving module 1501 is further configured to receive a third input.

The first displaying module 1502 is further configured to display K third electronic device identifiers in a third display region in response to the third input, where K is a positive integer, and the K third electronic device identifiers are contained in electronic device identifiers corresponding to the L first target electronic devices.

The second receiving module 1503 is configured to receive a fourth input for the third display region.

The sharing processing module 1505 is further configured to cancel, in response to the fourth input, sharing of the running interface of the target application with M second target electronic devices, where electronic device identifiers corresponding to the M second target electronic devices are contained in the K third electronic device identifiers.

The first electronic device provided in this embodiment of the present disclosure can implement the processes implemented by the first electronic device in the method embodiment in FIG. 1 to FIG. 14. To avoid repetition, details are not described herein again.

Figure 16:
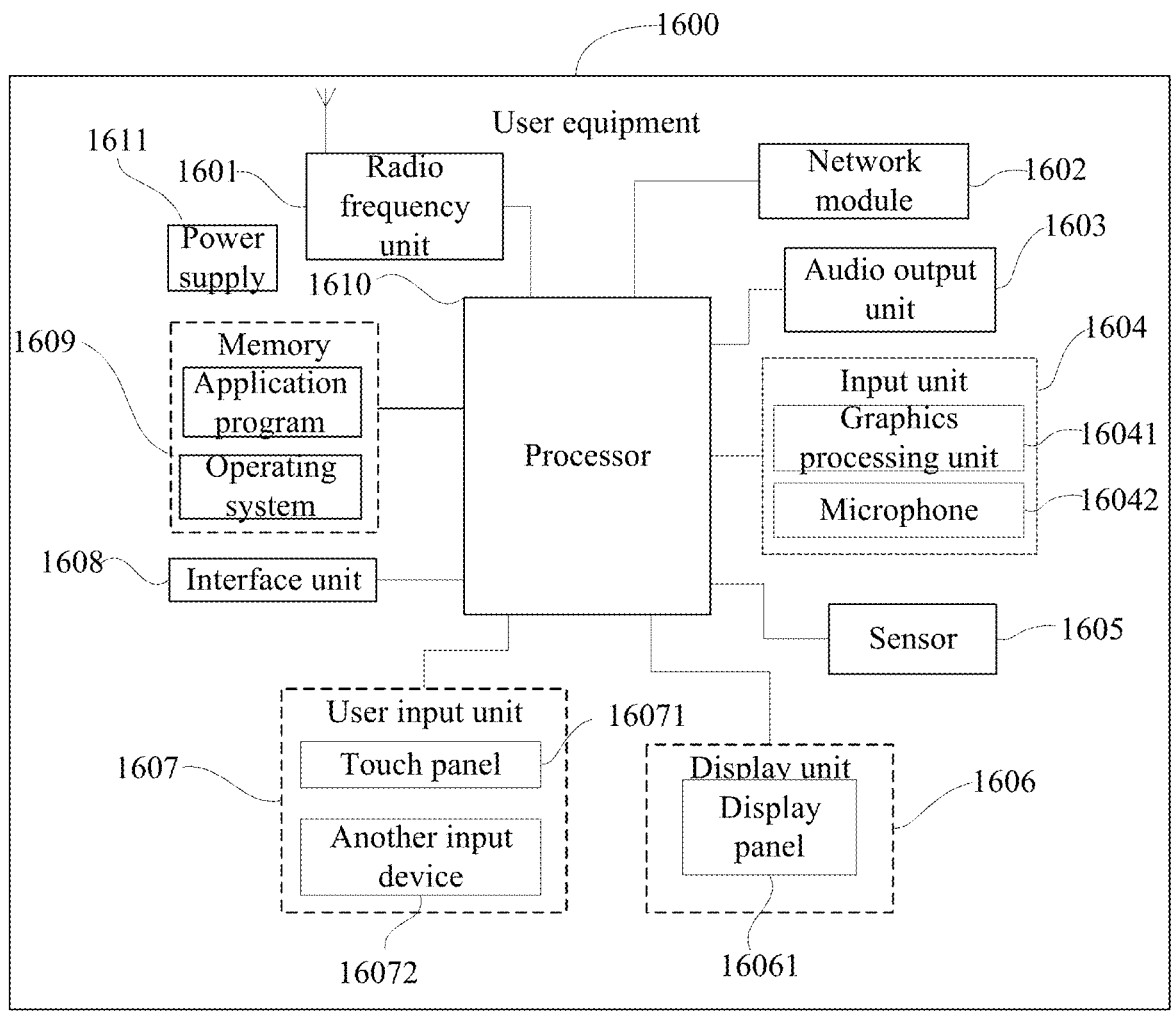
FIG. 16 is a structural diagram of an electronic device according to an embodiment of the present disclosure.

FIG. 16 is a schematic diagram of a hardware structure of an electronic device according to each embodiment of the present disclosure.

The electronic device 1600 includes but is not limited to components such as a radio frequency unit 1601, a network module 1602, an audio output unit 1603, an input unit 1604, a sensor 1605, a display unit 1606, a user input unit 1607, an interface unit 1608, a memory 1609, a processor 1610, and a power supply 1611. A person skilled in the art may understand that the structure of the electronic device shown in FIG. 16 constitutes no limitation on the electronic device. The electronic device may include more or fewer components than those shown in the figure, or a combination of some components, or an arrangement of different components. In this embodiment of the present disclosure, the electronic device includes but is not limited to a mobile phone, a tablet computer, a notebook computer, a palmtop computer, an in-vehicle terminal, a wearable device, a pedometer, and the like.

The user input unit 1607 is configured to receive a first input.

The processor 1610 is configured to display N second electronic device identifiers in a first display region in configured response to the first input, where N is a positive integer.

The user input unit 1607 is further configured to receive a second input.

The processor 1610 is further configured to: display a running interface of a target application in a virtual screen in response to the second input; and share the running interface of the target application with L first target electronic devices, where electronic device identifiers corresponding to the L first target electronic devices are contained in the N second electronic device identifiers.

It should be understood that, in this embodiment, the processor 1610 and the user input unit 1607 can implement the processes implemented by the first electronic device in the method embodiment in FIG. 1 to FIG. 14. To avoid repetition, details are not described herein again.

It should be understood that, in this embodiment of the present disclosure, the radio frequency unit 1601 may be configured to receive and send information or receive and send a signal in a call process. Specifically, after downlink data from a base station is received, the processor 1610 processes the downlink data. In addition, uplink data is sent to the base station. Generally, the radio frequency unit 1601 includes, but is not limited to, an antenna, at least one amplifier, a transceiver, a coupler, a low noise amplifier, a duplexer, and the like. In addition, the radio frequency unit 1601 may also communicate with a network and other devices through a wireless communication system.

The electronic device provides users with wireless broadband Internet access through the network module 1602, for example, helps users receive and send e-mails, browse web pages, and access streaming media.

The audio output unit 1603 may convert audio data received by the radio frequency unit 1601 or the network module 1602 or stored in the memory 1609 into an audio signal and output the audio signal as a sound. Moreover, the audio output unit 1603 may further provide audio output related to a specific function performed by the electronic device 1600 (for example, a call signal receiving sound and a message receiving sound). The audio output unit 1603 includes a speaker, a buzzer, a telephone receiver, and the like.

The input unit 1604 is configured to receive audio or radio frequency signals. The input unit 1604 may include a Graphics Processing Unit (GPU) 16041 and a microphone 16042. The graphics processing unit 16041 processes image data of a static picture or a video obtained by an image capturing apparatus (for example, a camera) in video capturing mode or image capturing mode. A processed image frame may be displayed on the display unit 1606. The image frame processed by the graphics processing unit 16041 may be stored in the memory 1609 (or another storage medium) or sent via the radio frequency unit 1601 or the network module 1602. The microphone 16042 may receive sound and can process such sound into audio data. The audio data obtained through processing may be converted, in a telephone call mode, into a format that may be sent to a mobile communication base station via the radio frequency unit 1601 for output.

The electronic device 1600 further includes at least one sensor 1605, for example, a light sensor, a motion sensor, and another sensor. Specifically, the light sensor includes an ambient light sensor and a proximity sensor. The ambient light sensor may adjust brightness of a display panel 16061 according to ambient light brightness. The proximity sensor may switch off the display panel 16061 and/or backlight when the electronic device 1600 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 1605 may further include a fingerprint sensor, a pressure sensor, an iris sensor, a molecular sensor, a gyroscope, a barometer, a hygrometer, a thermometer, an infrared sensor, or the like. Details are not described herein again.

The display unit 1606 is configured to display information entered by the user or information provided for the user. The display unit 1606 may include the display panel 16061, and the display panel 16061 may be configured in a form of a Liquid Crystal Display (LCD), an Organic Light-Emitting Diode (OLED), or the like.

The user input unit 1607 may be configured to receive entered number or character information, and generate key signal input related to user settings and function control of the electronic device. Specifically, the user input unit 1607 includes a touch panel 16071 and another input device 16072. The touch panel 16071 is also referred to as a touchscreen, and may collect a touch operation performed by a user on or near the touch panel 16071 (such as an operation performed by a user on the touch panel 16071 or near the touch panel 16071 by using any proper object or accessory, such as a finger or a stylus). The touch panel 16071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1610, and receives and executes a command sent by the processor 1610. In addition, the touch panel 16071 may be implemented as a resistive type, a capacitive type, an infrared type, a surface acoustic wave type, or the like. In addition to the touch panel 16071, the user input unit 1607 may further include another input device 16072. Specifically, the another input device 16072 may include but is not limited to: a physical keyboard, a function button (such as a volume control button, a switch button), a trackball, a mouse, and a joystick, which is not described herein.

Further, the touch panel 16071 may cover the display panel 16061. When detecting the touch operation on or near the touch panel 16071, the touch panel 16071 transmits the touch operation to the processor 1610 to determine a type of a touch event, and then the processor 1610 provides corresponding visual output on the display panel 16061 based on the type of the touch event. Although in FIG. 16, the touch panel 16071 and the display panel 16061 are configured as two independent components to implement input and output functions of the electronic device, in some embodiments, the touch panel 16071 and the display panel 16061 can be integrated to implement the input and output functions of the electronic device. Details are not limited herein.

The interface unit 1608 is an interface for connecting an external apparatus and the electronic device 1600. For example, the external apparatus may include a wired or wireless headset port, an external power supply (or a battery charger) port, a wired or wireless data port, a storage card port, a port configured to connect to an apparatus having an identification module, an audio Input/Output (I/O) port, a video I/O port, a headset port, and the like. The interface unit 1608 may be configured to receive input from an external apparatus (for example, data information and power) and transmit the received input to one or more elements in the electronic device 1600, or may be configured to transmit data between the electronic device 1600 and the external apparatus.

The memory 1609 may be configured to store a software program and various pieces of data. The memory 1609 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1609 may include a high-speed random access memory or a nonvolatile memory, for example, at least one disk storage device, a flash memory, or other volatile solid-state storage devices.

The processor 1610 is a control center of the electronic device and connects all parts of the electronic device using various interfaces and circuits. By running or executing software programs and/or modules stored in the memory 1609 and by calling data stored in the memory 1609, the processor 1610 implements various functions of the electronic device and processes data, thus performing overall monitoring on the electronic device. The processor 1610 may include one or more processing units. For example, an application processor and a modem processor may be integrated into the processor 1610. The application processor mainly processes an operating system, a user interface, an application program, and the like. The modem processor mainly processes wireless communications. It can be understood that the modem processor may not be integrated into the processor 1610.

The electronic device 1600 may further include the power supply 1611 (such as a battery) supplying power to each component. For example, the power supply 1611 may be logically connected to the processor 1610 by using a power management system, so as to implement functions such as charging management, discharging management and power consumption management by using the power management system.

In addition, the electronic device 1600 includes some functional modules not shown. Details are not described herein again.

An embodiment of the present disclosure further provides an electronic device, including a processor 1610, a memory 1609, and a computer program stored in the memory 1609 and capable of running on the processor 1610. When executed by the processor 1610, the computer program implements the processes in the foregoing embodiment of the application sharing method, and a same technical effect can be achieved. To avoid repetition, details are not described herein again.

An embodiment of the present disclosure further provides a computer-readable storage medium. The computer-readable storage medium stores a computer program. When executed by a processor, the computer program implements the processes in the foregoing embodiment of the application sharing method, and a same technical effect can be achieved. To avoid repetition, details are not described herein again. The computer-readable storage medium includes a Read-Only Memory (ROM), a Random Access Memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementations, a person skilled in the art may clearly understand that the method in the foregoing embodiments may be implemented by software in addition to a necessary universal hardware platform or by hardware only. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection scope of the present disclosure.

What is claimed is:

1. An application sharing method, performed by a first electronic device, the application sharing method comprising:
   receiving a first input;
   displaying N second electronic device identifiers in a first display region in response to the first input, wherein N is a positive integer;
   receiving a second input;
   displaying a running interface of a target application in a virtual screen on the first electronic device in response to the second input; and
   sharing the running interface of the target application with L first target electronic devices,
   wherein sharing the running interface of the target application with the L first target electronic devices comprises: performing screen recording on the virtual screen to obtain target data, and sharing the target data with the L first target electronic devices, and
   wherein electronic device identifiers corresponding to the L first target electronic devices are contained in the N second electronic device identifiers, and the electronic device identifiers corresponding to the L first target electronic devices are updated to display an application identifier of the target application after the running interface of the target application is shared with the L first target electronic devices.

2. The method according to claim 1, wherein the target application is an application running in a foreground.

3. The method according to claim 1, wherein after the receiving a first input, the method further comprises:
displaying M application identifiers in a second display region in response to the first input, wherein M is a positive integer, and an application identifier of the target application is contained in the M application identifiers.

4. The method according to claim 3, wherein the receiving a second input comprises:
receiving a dragging operation for the application identifier corresponding to the target application, wherein an end position of the dragging operation corresponds to a display position of an electronic device identifier of the first target electronic device.

5. The method according to claim 1, wherein the receiving a second input comprises:
receiving a first sliding operation in the first display region, wherein the L first target electronic devices are electronic devices corresponding to L second electronic device identifiers by which a sliding track corresponding to the first sliding operation passes.

6. The method according to claim 1, wherein after the sharing the running interface of the target application with L first target electronic devices, the method further comprises:
receiving a third input;
displaying K third electronic device identifiers in a third display region in response to the third input, wherein K is a positive integer, and the K third electronic device identifiers are contained in electronic device identifiers corresponding to the L first target electronic devices;
receiving a fourth input for the third display region; and
canceling, in response to the fourth input, sharing of the running interface of the target application with M second target electronic devices,
wherein electronic device identifiers corresponding to the M second target electronic devices are contained in the K third electronic device identifiers.

7. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
receiving a first input;
displaying N second electronic device identifiers in a first display region in response to the first input, wherein N is a positive integer;
receiving a second input;
displaying a running interface of a target application in a virtual screen on the first electronic device in response to the second input; and
sharing the running interface of the target application with L first target electronic devices,
wherein sharing the running interface of the target application with the L first target electronic devices comprises: performing screen recording on the virtual screen to obtain target data, and sharing the target data with the L first target electronic devices, and
wherein electronic device identifiers corresponding to the L first target electronic devices are contained in the N second electronic device identifiers, and the electronic device identifiers corresponding to the L first target electronic devices are updated to display an application identifier of the target application after the running interface of the target application is shared with the L first target electronic devices.

8. The electronic device according to claim 7, wherein the target application is an application running in a foreground.

9. The electronic device according to claim 7, wherein after the receiving a first input, the operations further comprise:
displaying M application identifiers in a second display region in response to the first input, wherein M is a positive integer, and an application identifier of the target application is contained in the M application identifiers.

10. The electronic device according to claim 9, wherein the receiving a second input comprises:
receiving a dragging operation for the application identifier corresponding to the target application, wherein an end position of the dragging operation corresponds to a display position of an electronic device identifier of the first target electronic device.

11. The electronic device according to claim 7, wherein the receiving a second input comprises:
receiving a first sliding operation in the first display region, wherein the L first target electronic devices are electronic devices corresponding to L second electronic device identifiers by which a sliding track corresponding to the first sliding operation passes.

12. The electronic device according to claim 7, wherein after the sharing the running interface of the target application with L first target electronic devices, the operations further comprise:
receiving a third input;
displaying K third electronic device identifiers in a third display region in response to the third input, wherein K is a positive integer, and the K third electronic device identifiers are contained in electronic device identifiers corresponding to the L first target electronic devices;
receiving a fourth input for the third display region; and
canceling, in response to the fourth input, sharing of the running interface of the target application with M second target electronic devices,
wherein electronic device identifiers corresponding to the M second target electronic devices are contained in the K third electronic device identifiers.

13. A non-transitory computer-readable medium storing instructions that, when executed by a processor, cause the processor to perform an application sharing method, wherein the method comprises:
receiving a first input;
displaying N second electronic device identifiers in a first display region in response to the first input, wherein N is a positive integer;
receiving a second input;
displaying a running interface of a target application in a virtual screen on the first electronic device in response to the second input; and
sharing the running interface of the target application with L first target electronic devices,
wherein sharing the running interface of the target application with the L first target electronic devices comprises: performing screen recording on the virtual screen to obtain target data, and sharing the target data with the L first target electronic devices, and
wherein electronic device identifiers corresponding to the L first target electronic devices are contained in the N second electronic device identifiers, and the electronic device identifiers corresponding to the L first target electronic devices are updated to display an application identifier of the target application after the running interface of the target application is shared with the L first target electronic devices.

14. The non-transitory computer-readable medium according to claim 13, wherein the target application is an application running in a foreground.

15. The non-transitory computer-readable medium according to claim 13, wherein after the receiving a first input, the method further comprises:
displaying M application identifiers in a second display region in response to the first input, wherein M is a positive integer, and an application identifier of the target application is contained in the M application identifiers.

16. The non-transitory computer-readable medium according to claim 15, wherein the receiving a second input comprises:
receiving a dragging operation for the application identifier corresponding to the target application, wherein an end position of the dragging operation corresponds to a display position of an electronic device identifier of the first target electronic device.

17. The non-transitory computer-readable medium according to claim 13, wherein the receiving a second input comprises:
receiving a first sliding operation in the first display region, wherein the L first target electronic devices are electronic devices corresponding to L second electronic device identifiers by which a sliding track corresponding to the first sliding operation passes.

18. The non-transitory computer-readable medium according to claim 13, wherein after the sharing the running interface of the target application with L first target electronic devices, the method further comprises:
receiving a third input;
displaying K third electronic device identifiers in a third display region in response to the third input, wherein K is a positive integer, and the K third electronic device identifiers are contained in electronic device identifiers corresponding to the L first target electronic devices;
receiving a fourth input for the third display region; and
canceling, in response to the fourth input, sharing of the running interface of the target application with M second target electronic devices,
wherein electronic device identifiers corresponding to the M second target electronic devices are contained in the K third electronic device identifiers.

19. The method according to claim 1, wherein the target data comprises a sequence of displayed pictures of the virtual screen.

* * * * *